United States Patent [19]

Okazaki

[11] Patent Number: 4,830,015

[45] Date of Patent: May 16, 1989

[54] METHOD AND SYSTEM FOR MEASURING AN ULTRASOUND TISSUE CHARACTERIZATION

[75] Inventor: Kiyoshi Okazaki, Tochigi, Japan

[73] Assignee: Kabushiki Kaisha Toshiba, Kawasaki, Japan

[21] Appl. No.: 94,737

[22] Filed: Sep. 9, 1987

[30] Foreign Application Priority Data

Sep. 16, 1986 [JP] Japan .................................. 61-218694
Mar. 5, 1987 [JP] Japan .................................... 62-48962

[51] Int. Cl.$^4$ .............................................. A61B 8/00
[52] U.S. Cl. ........................... 128/660.06; 128/660.04; 73/597; 73/599; 73/602
[58] Field of Search ....................... 128/660.06, 660.04; 73/597, 599, 602

[56] References Cited

U.S. PATENT DOCUMENTS

| | | | |
|---|---|---|---|
| 4,575,799 | 3/1986 | Miwa et al. ......................... | 73/599 X |
| 4,700,571 | 10/1987 | Okazaki ................................ | 73/597 |
| 4,716,765 | 1/1988 | Hirama ............................ | 128/660 X |

OTHER PUBLICATIONS

Bhagat, P. K. et al., "Microprocessor-Based System for UTS Tissue Characterization", Med. Instr., vol. 14, No. 4, Jul.-Aug. 1980.

Primary Examiner—Francis Jaworski
Attorney, Agent, or Firm—Finnegan, Henderson, Farabow, Garrett & Dunner

[57] ABSTRACT

An ultrasonic image of a living body is obtained by use of an ultrasonic apparatus and, an ultrasound tissue characterization value at a region of interest of the body, such as the ultrasound propagation velocity, the scattered ultrasound waveform width, and the attenuation coefficient, is measured and calculated by use of a cross beam method. These processes are performed in real time and the results of processing are continuously displayed. In this way, the tissue characterization values of the living body can be determined and the state of a disease present in the region of interest can be examined readily and clearly.

21 Claims, 18 Drawing Sheets

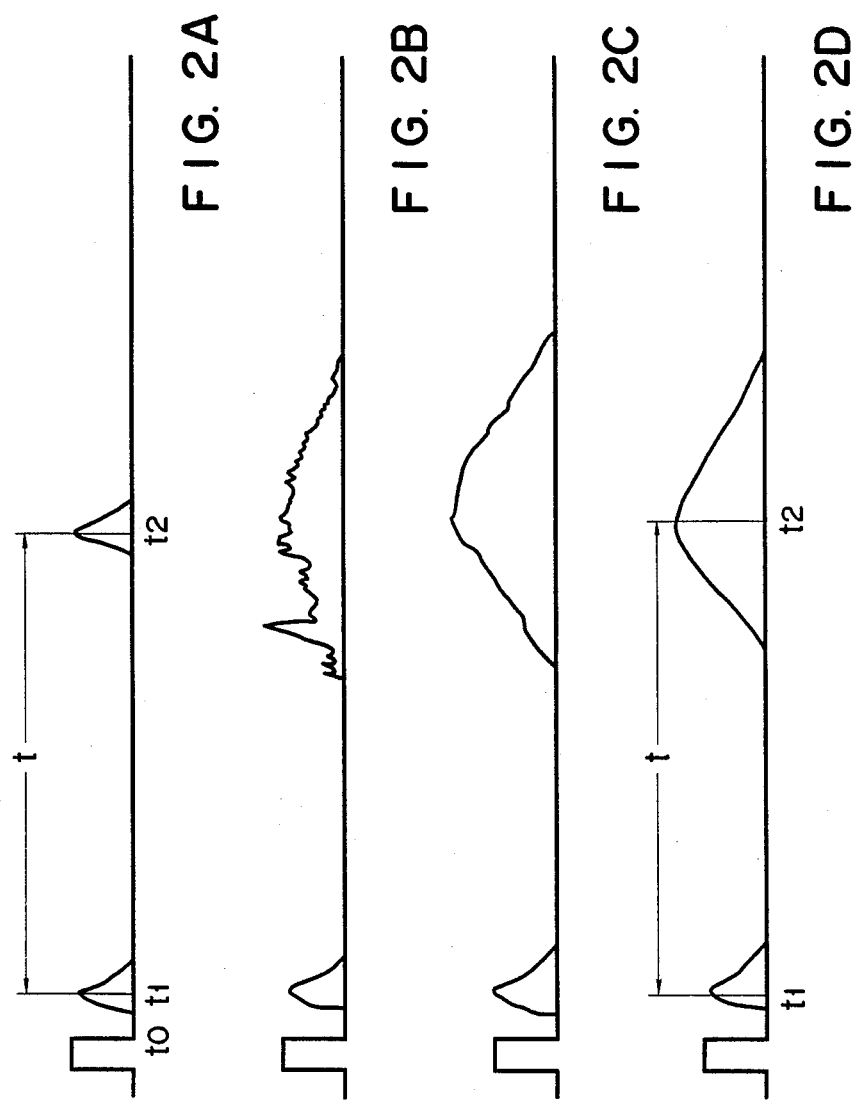

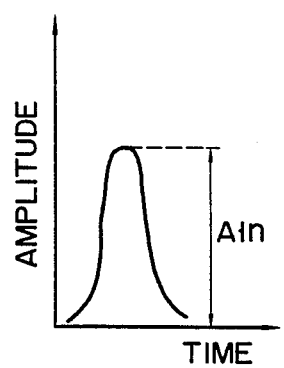 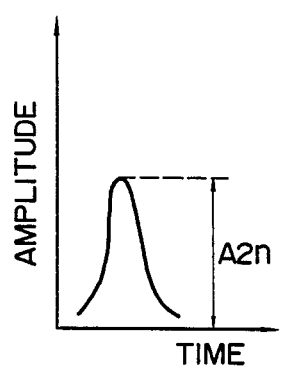 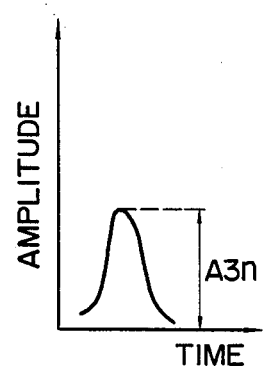
F I G. 10A  F I G. 10B  F I G. 10C
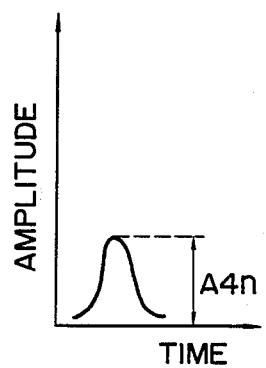 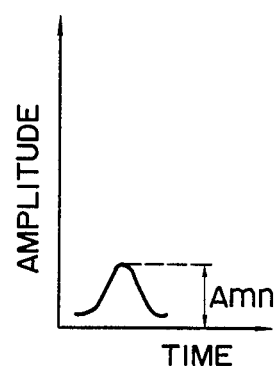
F I G. 10D  F I G. 10E

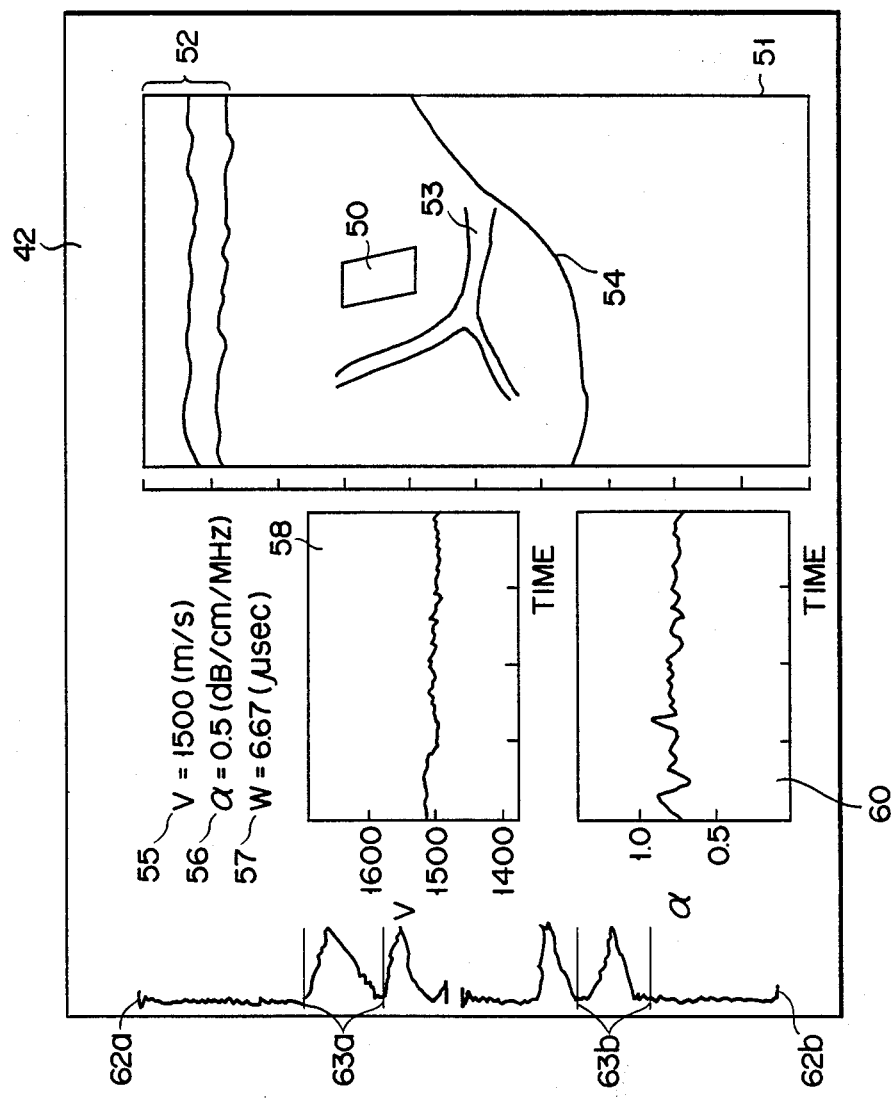
F I G. 12

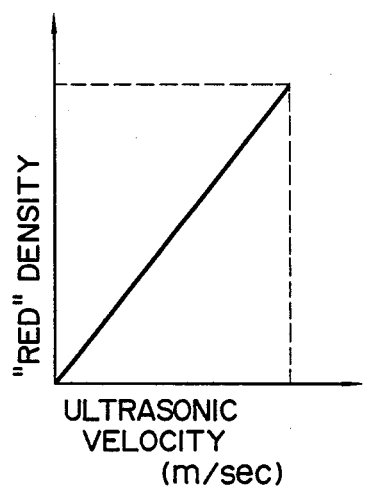
F I G. 15A
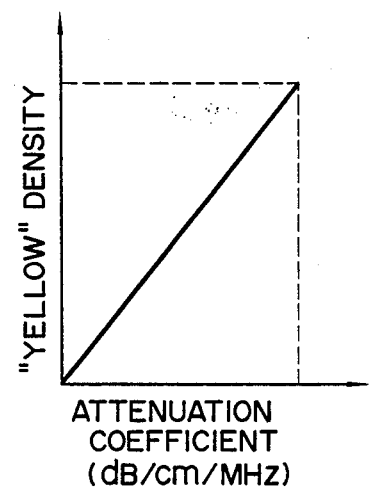
F I G. 15B
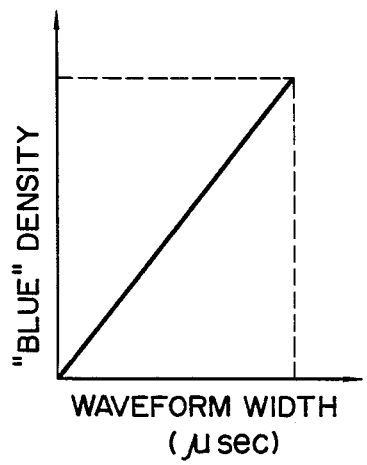
F I G. 15C

METHOD AND SYSTEM FOR MEASURING AN ULTRASOUND TISSUE CHARACTERIZATION

BACKGROUND OF THE INVENTION

This invention relates to a method and a system for acquiring ultrasound tissue characterization values for example, the ultrasound propagation velocity, the scattered ultrasound waveform, etc., for tissues of a living subject, in connection with an ultrasound image, so that the structure of the tissue of the living subject may be determined.

The ultrasound propagation velocity and the scattering of the ultrasound waveform, for example, in living tissue, are influenced by the intervening tissue or organs situated along the propagation path. This fact is of clinical value because the development of a disease such as a tumor in the living tissue can be ascertained by measuring the ultrasound propagation velocity and the scattered ultrasound waveform. Attempts have been made to evaluate the tissue characterization of a region of interest (ROI) in living tissue by measuring the ultrasound propagation velocity and the scattered ultrasound waveform in the living tissue. A method such as that shown in FIG. 1, in which a linear electronic scan type ultrasound diagnostic apparatus is used, has been proposed as the aforementioned evaluating ultrasound measuring method. In FIG. 1, an ultrasound pulse is transmitted at an angle of $\theta$ from one end an of ultrasound transmitting/receiving surface 2 adjacent to, for example, the tissue surface (not shown), toward the body of the patient by means of a ultrasound type linear electronic scan probe 1. Here, the electronic scan type ultrasound apparatus uses a probe which comprises a linear array of ultrasound oscillating elements. Some of the adjacent oscillating elements in the probe receive drive pulses, each having a predetermined delay time which is determined in accordance with the direction of the ultrasonic wave or beam transmission and the position of the oscillating element, and are transmitted as an ultrasound oscillation, wave or beam. The transmitted ultrasonic beam travels straight along transmission path 3, for example, in the living tissue, and is echoed back or reflected at a point P. The reflected ultrasonic wave or beam is received at the other end b of probe 1 along receiving path 4, instead of being directed toward the aforementioned oscillating elements at end a.

This is known as a cross beam method, in which the ultrasonic wave crosses at the point of intersection of transmitting path 3 and receiving path 4. The scattered waveform of the ultrasound beam thus obtained contains various data relating to the tissue structure of the examined part of the living body.

Since, in the arrangement shown in FIG. 1, the distance y between the ends a and b of probe 1 is already known, then if the propagation time t of ultrasonic wave travelling along transmitting and receiving paths 3 and 4 is measured, the propagation velocity C of the ultrasonic wave, travelling through the living tissue can be given by:

$$C = y/(t \cdot \sin\theta) \quad (1)$$

If the average velocity $C_0$ of the ultrasonic propagating through the living tissue is 1530 [m/s], and the distance between the adjacent oscillating elements is represented by d, the delay time $\tau_0$ between the adjacent oscillating elements can be given by $$\tau_0 = (d/C_0) \cdot \sin\theta_0 \quad (2)$$

in order to transmit the ultrasonic wave at an angle of $\theta_0$. In this way, the aforementioned delay time is set to permit the respective oscillating elements to be driven accordingly.

Where the propagation velocity of the ultrasonic wave travelling through the living tissue is represented by C, then the ultrasonic wave travels in a direction given by the angle $\theta$. Since, in general, C is different from $C_0$, the direction given by the angle $\theta_0$ at which the ultrasonic wave propagates is represented by the following equation using the Snell's laws.

$$\sin\theta/C = \sin\theta_0/C_0 \quad (3)$$

Equation (3) being substituted into Equation (1), the ultrasound propagation velocity C becomes:

$$C = \sqrt{y \cdot C_0/(t \cdot \sin\theta_0)} \quad (4)$$

Substituting Equation (2) into Equation (4) yields $$C = \sqrt{y \cdot d/t \cdot \tau_0} \quad (4')$$

With y, d, and $\tau_0$ already being known, Equation (4') can be evaluated using ultrasonic wave propagation time t, which is determined by means of the cross beam method. In this way, the ultrasound propagation velocity C is obtained.

FIGS. 2A through 2D are timing charts for illustrating the method for evaluating the ultrasonic wave propagation time t. In FIG. 2A, the ultrasound pulse is transmitted at a time somewhat behind the time $t_0$ at which the rate pulse rises. Here, $t_1$ represents the time corresponding to the peak amplitude value of the ultrasound pulse. Where a reflector is located at the intersection between the ultrasound transmitting direction and the receiving direction, the ultrasound propagation time t is ascertained at time $(t_2 - t_1)$, when the receiving waveform is obtained which has a peak amplitude value at time $t_2$.

In fact, it is rare that a point reflector is located within the living tissue and, where the ROI, for example, in the living tissue, is relatively uniform so that the reflected ultrasonic wave emerges as a relatively uniform received waveform. As is shown in FIG. 3, a ROI with a certain width is located at the points P1, P2, with the intersection P as a center, because the transmitted ultrasound beam has a finite width. That is, the ultrasonic wave first reaches the probe by reflection at point P1, and the last portion of the ultrasonic wave reaches the probe by reflection at point P2. For this reason, the received waveform has a time width corresponding to the range from point P1 to point P2. In this case, the received waveform becomes a broadened scattered waveform, as is shown in FIG. 2B, and thus, due to the living tissue not being completely uniform, the ultrasonic wave scattered at various locations in the living tissue is received as a synthesized signal component. In this way, a random received waveform appears. Since, however, it is not possible to detect the peak amplitude value from the random received waveform, the position of the probe is somewhat displaced so that the location of the aforementioned intersection within the living tissue may be moved. The received waveforms obtained at these times, if additively averaged for example, appear to vary smoothly in a wavy fashion, as is shown in FIG. 2C. If, in addition to the aforementioned method, curve fitting is also employed, using a least squares method, through the use of a unimodal function with a single peak, it is possible to obtain a very smooth curve, such as is shown in FIG. 2D.

A method for measuring the ultrasound propagation velocity has also been proposed which employs a symmetric measuring system to which the cross beam method is applied. This is known as a 4-beam method, as is disclosed in more detail in FIG. 4. As is shown in FIG. 4, in order to measure the ultrasound propagation velocity at reflection measuring points $P_{11}$ and $P_{12}$ (the upper boundary), and at a reflection measuring point $P_{00}$ (the lower boundary), four ultrasound beam transmitting/receiving signal routes are established: (R1) a→$P_{00}$→b, (R2) a→$P_{11}$→c, (R3) b→$P_{00}$→a; and (R4) b→$P_{12}$→d. This provides a symmetric measuring route, to allow the same angle $\theta$ to the ultrasound transmitting/receiving directions.

According to this method, symmetric measurements are made twice per route at the forward path and at the backward path. In the evaluation of the ultrasound propagation velocity, the average value can be obtained, to reduce any operational error. The ultrasound propagation velocity measuring function employing the cross beam method is incorporated into the ultrasonic apparatus. The values obtained, together with the ultrasound image such as a B mode, is displayed in real time on a display unit. This display is shown in FIG. 5. In FIG. 5, marker 10 represents a setting route for measuring the ultrasound propagation velocity at the ROI of the living body and marker 10 shown on B mode image 11 which is measured in real time. A mode images 13a, 13b, obtained by measuring the ultrasound propagation velocity using the aforementioned cross beam method, respective ultrasound propagation velocity values 14, and time variation diagram 15 of the average ultrasound propagation velocity value, are displayed on the other area of display 12. Marker 10 shows routes R1 through R4 as set forth above in connection with FIG. 4. Ultrasound propagation velocity value 14 is V1 for route R1, V2 for route R2, V3 for route R3 and V4 for route R4, V indicates the average value of these four values V1 to V4. A mode images 13a and 13b are the ultrasound echoes passing through route R1 or R3 and route R2 or R4, respectively. Gates 16a and 16b showing the A mode are set to extract only the ultrasonic wave echoed back from the ROI and to eliminate those ultrasound echoes back from those area adjacent to the ROI. These gates 16a and 16b with predetermined width are set based on the propagation time obtained from the ultrasound propagation velocity and distance to the ROI in the living body. In the image display, B mode image 11 is sequentially measured in real time, and updated, while the ultrasound propagation velocity is measured in the aforementioned cross beam method on the aforementioned four routes.

FIG. 6 shows one form of display at a "freeze" time as substantially similar to a real time display. At the "freeze" time, scattered waveform width 20 and average A mode images 21a, 21b for the respective routes are also displayed on display 12.

In the conventional system, of the living tissue characterization values, the average value of the ultrasound propagation velocity is repetitively measured and displayed. On the other hand, the scattered waveform is measured and displayed at the "freeze" time only, as shown in FIG. 6.

However, for example, the tissue structure of the ROI in the liver is not uniform during the development of the disease and the scattered waveform is consequently varied by the disease as various kinds of scattering objects of assume various sizes, and as the abnormal tissue regions microscopically invade the normal tissue. For this reason, the state of the disease cannot be exactly determined, often causing difficulty in determining the presence of the disease. It is, therefore, required that the scattered waveform be measured as the ultrasound propagation velocity.

SUMMARY OF THE INVENTION

It is accordingly an object of this invention to provide a method and system for measuring an ultrasound image and an ultrasound tissue characterization such as the ultrasound propagation velocity and the scattered waveform in real time, in order to determine quantitatively the tissue characterization of a subject to be examined, for example, a living tissue.

In one aspect of this invention, a method for measuring an ultrasound tissue characterization comprises the steps of:

sequentially transmitting an ultrasonic wave from ultrasound oscillating elements using a plurality of ultrasound oscillating elements juxtaposed in a probe;

obtaining an ultrasound image by sequentially receiving the ultrasonic wave echoed back from a region of interest of a subject;

measuring a scattered ultrasound waveform echoed back from the region of interest by use of a cross beam method during the obtaining of at least one ultrasound image;

detecting a peak amplitude value, a time for the peak amplitude value and a waveform width, obtained from said scattered ultrasound waveform;

computing at least one tissue characterization value selected from an ultrasound propagation velocity obtained by the time at said peak amplitude value and an attenuation coefficient obtained by a distance from the probe to the region of interest at said peak amplitude value; and determining quantitatively an ultrasound tissue characterization by displaying said ultrasound image and at least one tissue characterization value in real time and at the same time.

In another aspect of this invention a system for measuring an ultrasound tissue characterization comprises:

means for sequentially transmitting an ultrasonic wave from ultrasound oscillating elements using a plurality of ultrasound oscillating elements juxtaposed in a probe;

means for obtaining an ultrasound image by sequentially receiving the ultrasonic wave echoed back from a region of interest of a subject to be examined;

means for measuring a scattered ultrasound waveform echoed back from the region of interest, by use of a cross beam method during the obtaining of at least one ultrasound image;

means for detecting a peak amplitude value, a time at the peak amplitude values, and a waveform width obtained from said scattered ultrasound waveform;

means for computing at least one tissue characterization value selected from an ultrasound propagation velocity obtained by time at the peak amplitude value and an attenuation coefficient obtained by a distance from the probe to the region of interest at said peak amplitude value; and means for determining quantitatively an ultrasound tissue characterization by displaying said ultrasound image and at least one tissue characterization value in real time and at the same time.

BRIEF DESCRIPTION OF THE DRAWINGS

FIGS. 2A through 2D are timing charts for explaining ultrasound propagation time;

FIGS. 10A to 10E are scattered waveforms in the depth direction of a region of interest of a subject to be examined on a system according to this invention;

FIGS. 12 and 13 are forms of display in real time and "freeze" time as obtained on the system of this invention;

FIGS. 15A to 15C are views showing ultrasound propagation velocity, attenuation coefficient and scattered waveform width in a distribution as displayed, as a color image, in a color-matched fashion;

DETAILED DESCRIPTION OF THE PREFERRED EMBODIMENT AND METHOD

The perferred embodiment and method of this invention will be explained below in connection with the accompanying drawings.

Figure 7:
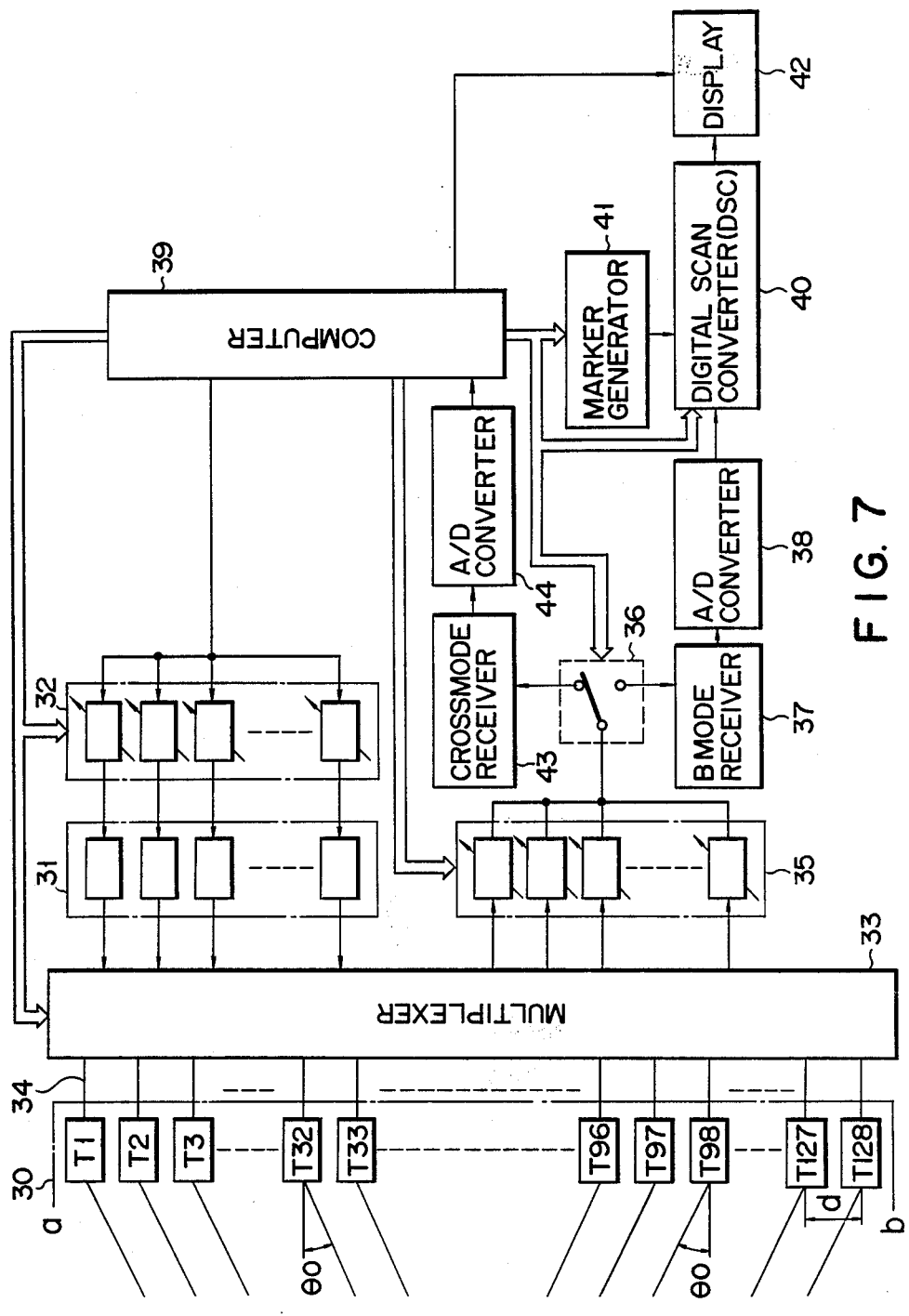
FIG. 7 is a block diagram showing an arrangement of an ultrasonic apparatus for carrying out the preferred embodiment and method of this invention.

FIG. 7 is a block diagram showing the arrangement of an ultrasonic apparatus for carrying out this invention. In FIG. 7, ultrasonic probe 30 is comprised of, for example, 128 ultrasound transmitting/receiving oscillating elements in a linear array. The oscillating elements in probe 30 are sequentially oscillated, by pulser 31 and transmitting delay circuit 32, through multiplexer (selection changeover switch) 33 and lead wires 34 at a predetermined time interval and transmit an ultrasonic wave, noting that pulser 31 generates an ultrasound oscillation drive pulse and that transmitting delay circuit 32 is used to impart a delay time to the respective oscillating elements. The ultrasonic wave echoed back from the living body is received by the oscillating elements in probe 30 and converted to an electric signal. The electric signal passes through lead wires 34 and multiplexer 33 and is received by receiving delay circuit 35 at a time interval corresponding to the time delay of transmitting delay circuit 32. Changeover switch 36 is used to pass the output of receiving delay circuit 35 to an apparatus to which the cross beam method is applied or an apparatus for obtaining an ultrasound B mode. In receiving circuit 37 on the side of the ultrasonic apparatus for obtaining an ultrasonic B mode image, the received signal is amplified and signal level correction of the depth direction is carried out through the logarithmic conversion. The received signal is converted by analog to digital (A/D) converter 38 to a digital signal. Route marker generator 41 delivers measured route data at the time of measurement of the cross mode to digital scan converter (DSC) 40 for display in a B mode image. The data output from A/D converter 38 and data output from route marker generator 41 are sequentially stored in digital scan counter (DSC) 40, and the collection timing of the ultrasound B mode and display timing of display 42 are accommodated due to the presence of a frame memory.

The measuring operation is carried out in the cross beam method as follows.

Figure 1:
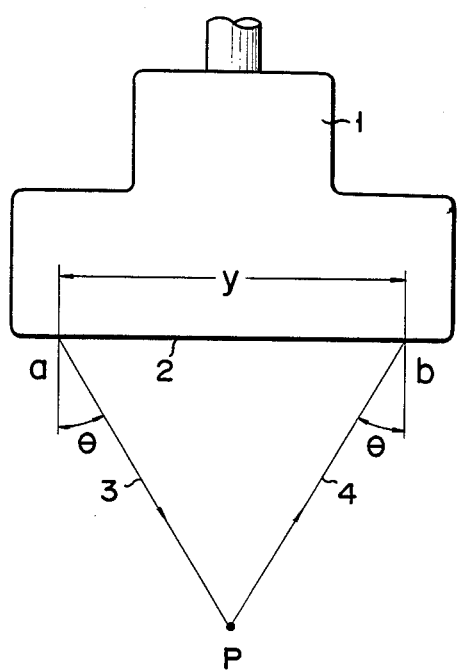
FIG. 1 is a view showing the principle of a cross beam method.
Figure 3:
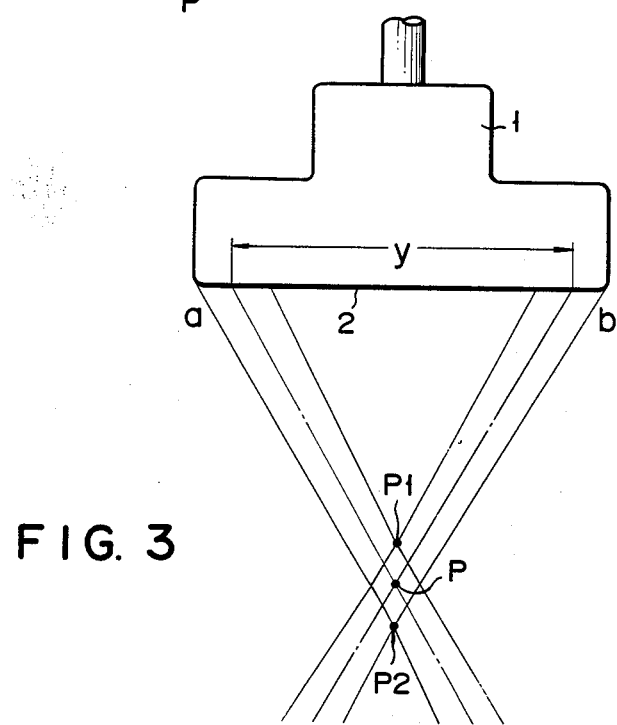
FIG. 3 is a view showing the broadening of an ultrasound beam in a cross beam method.
Figure 4:
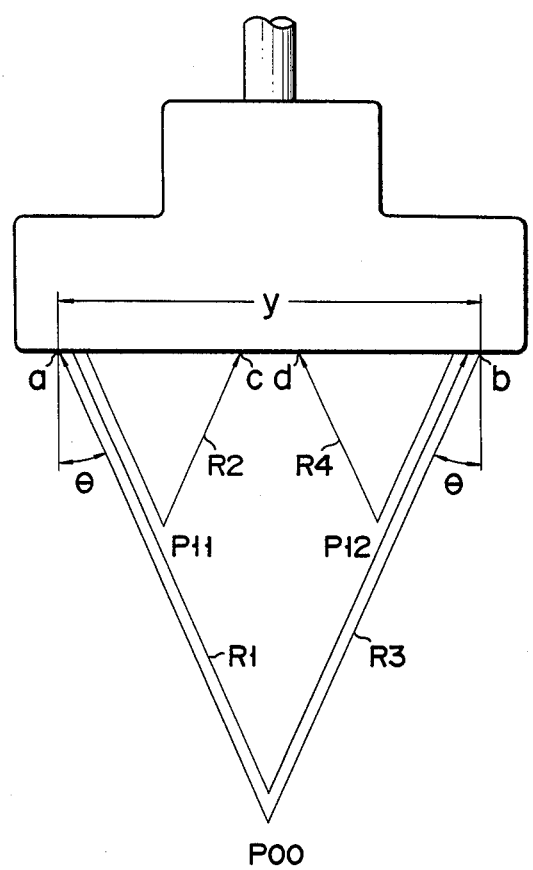
FIG. 4 shows the transmitting and receiving of the ultrasonic wave in a 4-beam method on a conventional ultrasonic apparatus.
Figure 5:
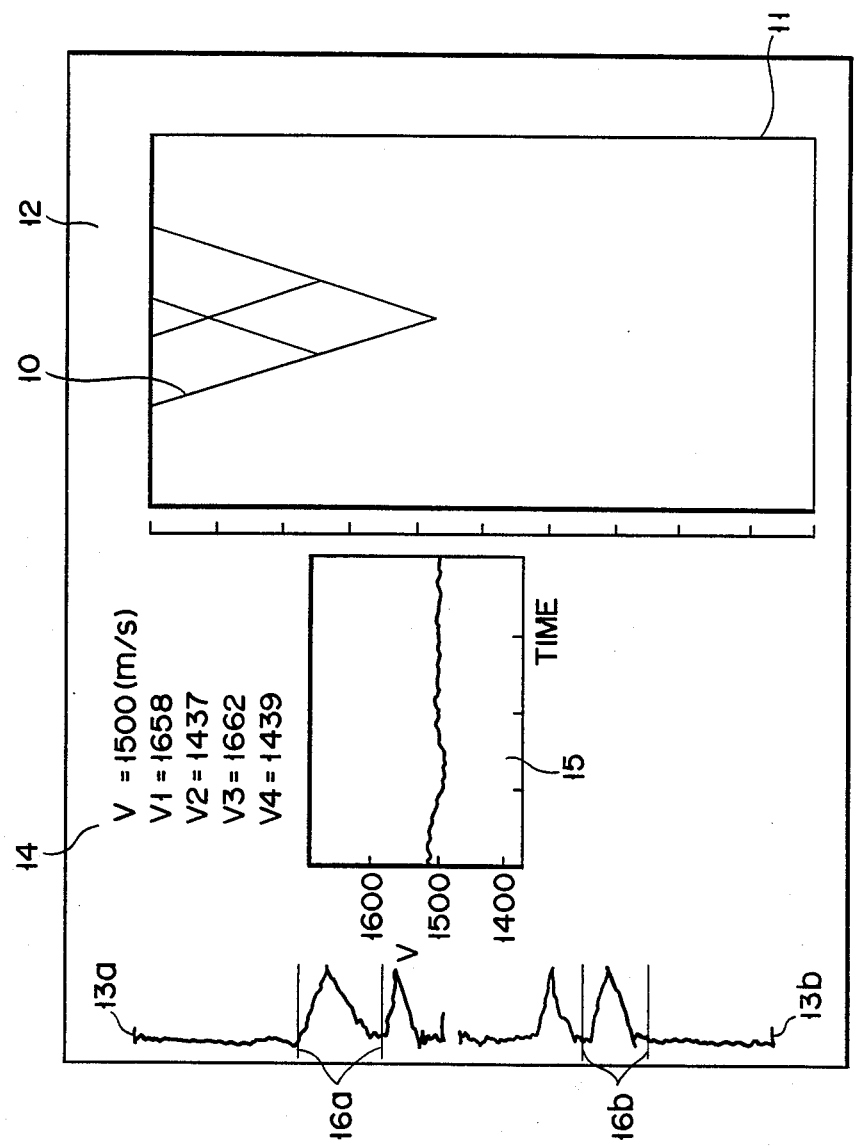
FIGS. 5 and 6 show one form of display in real time and "freeze" time as obtained on the conventional ultrasonic apparatus.
Figure 6:
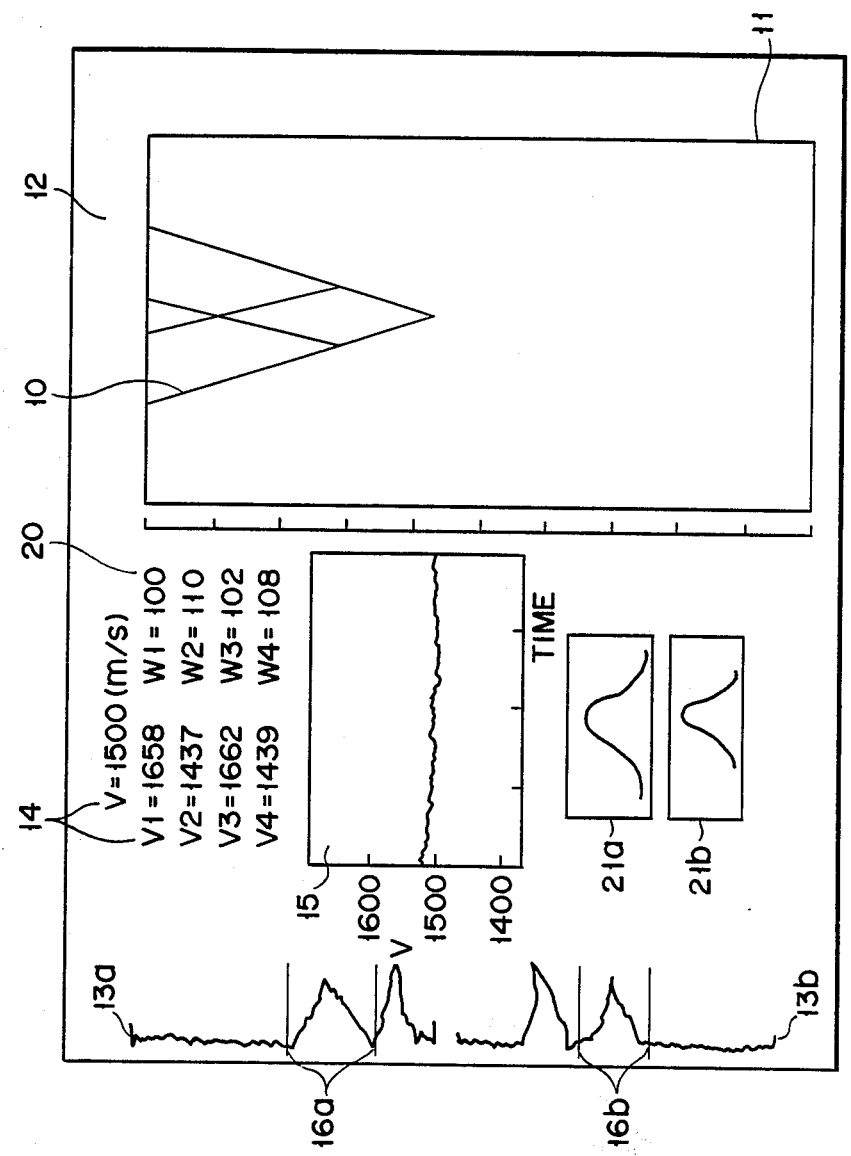
Figure 8:
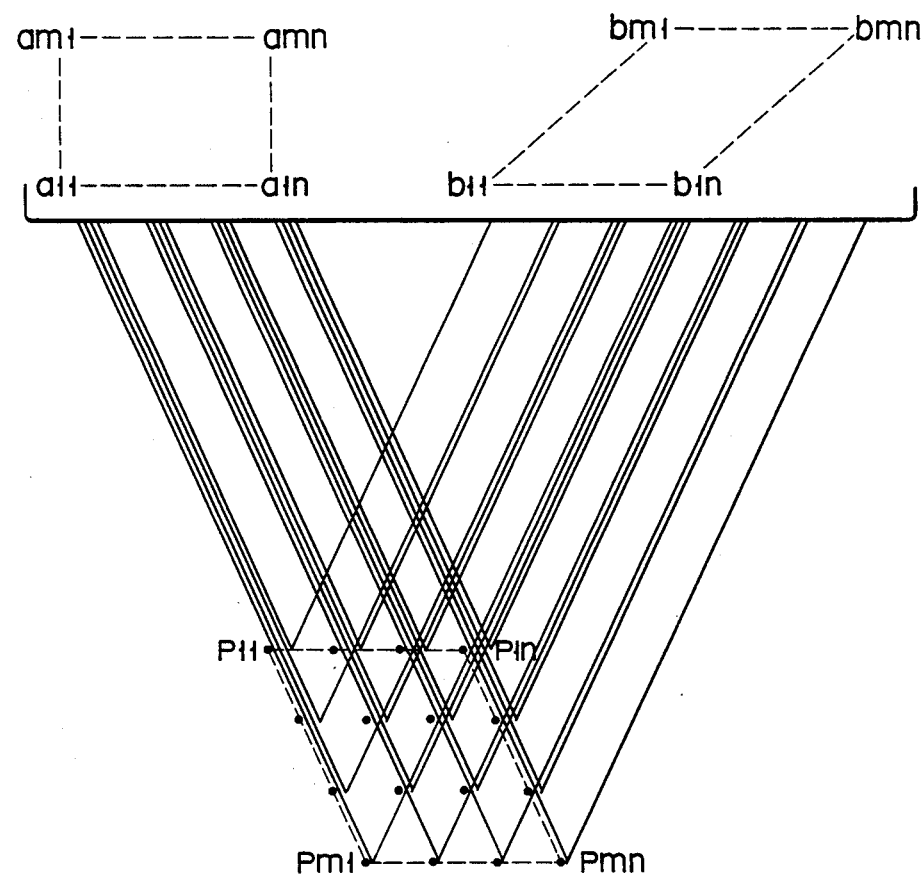
FIG. 8 is a view for explaining an ultrasonic scanning area of a region of interest of a subject in accordance with the preferred embodiment of this invention.

In the arrangement of FIG. 8, if the ultrasound scattering waveforms of the ROI within the living body contained at echo measuring points $P_{ll}$ and $P_{ln}$ at the upper boundary and echo measuring points $P_{ml}$ and $P_{mn}$ at the lower boundary are to be measured on the present system, the ultrasound beam takes $m \times n$ transmitting/receiving routes. In this case, the positions a and b of the probe may be employed as the ultrasound transmitting/receiving position. For example, the ultrasonic wave is transmitted from the position $a_{11}'$ echoed back from the position $P_{11}'$ received at the position $b_{11}$; the ultrasonic wave is also transmitted from the position $a_{12}'$ echoed back at the position $P_{12}$ and received at the position $b_{12}$; and the ultrasonic wave is transmitted from the position $a_{mn}'$ echoed back from the position $P_{mn}'$ and received at the position $b_{mn}$ to scan the whole area of the ROI. The reverse route may be taken from the position b to the position a. The received signal is delivered to cross mode receiver 43 (FIG. 1) and hence to A/D converter 44 to convert it to a digital signal. The digital signal is input to computer 39 with a fast calculating circuit, where the ultrasound propagation velocity and width of the scattered waveform are calculated or evaluated from the scattered waveform and the timing relationships embodied in the scattered waveform. The result is displayed on display 42. Furthermore, statistical processing can be performed with the measuring route as a region, thus reducing error. The attenuation coefficient can be found by measuring the depth dependency of the averaged scattered waveform over the ROI within the living body.

The operation of the present system will now be explained below.

According to the present system, the measuring operation by the cross beam method can be performed at a predetermined time through the switching of changeover switch 36 during the measurement of the B mode image.

Stated in more detail, changeover switch 36 is switched to the B mode image measuring side under control of computer 39 and selection is performed at multiplexer 33 for linear scan. The delay time for linear scan is set at transmitting and receiving delay circuits 32 and 35 whereby an ultrasonic wave or beam is transmitted and received from those oscillating elements selected by multiplexer 33. The received signal is amplified by B mode receiver 37 and supplied to A/D converter 38 where it is converted to a digital signal. The digital signal of A/D converter 38 is stored in a frame memory at an ultrasound scanning location of DSC 40.

At a predetermined time, changeover switch 36 is switched to the cross mode measuring side under control of computer 39 to perform measurement by the cross beam method. The delay time of transmitting delay circuit 32 is set by a control signal from computer 39. The delay time is set so that the transmitting time difference $\tau_0$ between the adjacent oscillating elements has a relation $\tau_0 = (d/C_0)\sin\theta_0$. Through the switching operation of multiplexer 33, oscillating elements T1 to T32 in probe 30 are connected to the output terminals of pulser 31.

A rate pulse is generated with the use of the clock of computer 39 and supplied to transmitting delay circuit 32. The transmitting delay circuit 32 delivers an oscillating pulse with appropriately delayed timing to the predetermined ones of oscillating elements T1 to T32 from which the ultrasonic wave is to be generated.

The delay time is set under control of computer 39 oscillating elements T97 to T128 belonging to the position b in probe 30 are connected to the corresponding input terminals of said receiving delay circuit 35 through the changeover switches of multiplexer 33. In this way, the ultrasound beam transmitted to a subject, such as a living body, is received by those oscillating elements at the position b in probe 30, where components are reflected and at the point P. Those reflected and received ultrasonic signals are time-delayed as in the case of transmitting, and synthesized and produced after aligning their time axis. The output of the received ultrasonic wave from receiving delay circuit 35, after being amplified by cross mode receiver 43, is converted by A/D converter 44 to a digital signal and supplied to computer 39. That is, the ultrasonic waves reflected from the measuring point at a predetermined time for each transmission of the ultrasound beam is stored in a manner corresponding to the respective time at computer 39. This provides A mode image data.

An ultrasound B mode image is formed by DSC 40, while scanning a measuring area during the mode switching which is performed at a predetermined time interval. The route marker data for the measurement of the cross mode which is set by route marker generator 41 is stored in a manner to be superimposed over the B mode image in the frame memory of DSC 40. The image data on the frame memory of DSC 40 thus formed is displayed on display 42. Furthermore, the ultrasound signals of the ROI during the measuring operation in the cross mode are additively averaged and the result is displayed on display 42.

Although in the aforementioned embodiment the measuring operation has been explained in the cross mode during the generation or acquisition of one ultrasound B mode image, the cross mode measurement may be performed after one ultrasound B mode has been obtained. In either case, it is possible to effect measurement in real time.

Figure 9A:
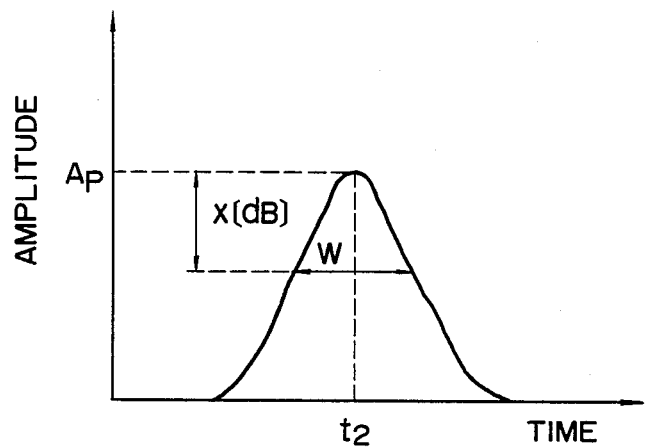
FIGS. 9A and 9B are views for evaluating the width and area of a scattered waveform.
Figure 9B:
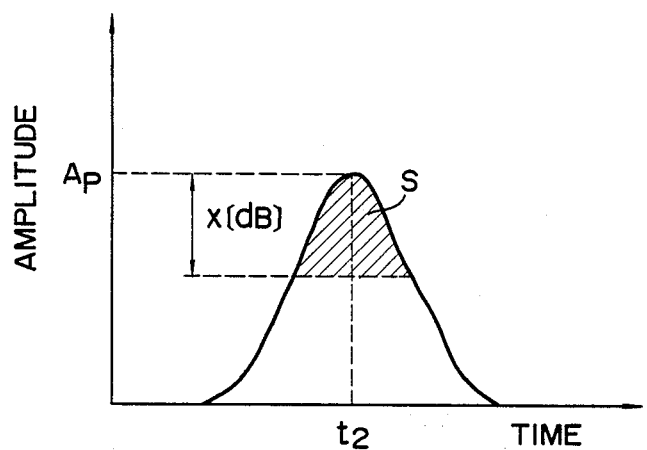

FIGS. 9A and 9B show a graph of a scattered waveform as obtained through the measurement in the cross beam method. In the graphs of FIGS. 9A and 9B, the scattered waveform is plotted with the amplitude on the ordinate and time on the abscissa. In the graph shown in FIG. 9A, the waveform width W is found at a location of x [dB] down, for example, 3 [dB] down, from the peak value Ap of the respective scattered waveform. The area S corresponds to a region defined by the peak value Ap and waveform width W, but is not required in the embodiment of this invention.

Figure 11:
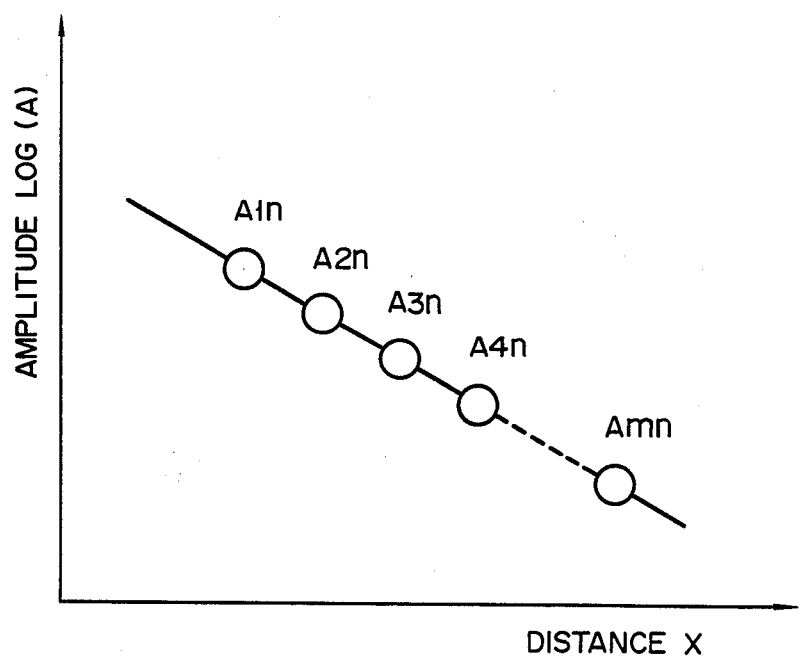
FIG. 11 is a view for obtaining an attenuation coefficient from a peak amplitude value of a scattered ultrasound waveform in the depth direction.

FIGS. 10A to 10E show the scattered waveform in the depth direction as obtained through measurement with the cross beam method, noting that the ordinate is the amplitude of the scattered waveform and the abscissa is time. FIG. 11 is a graph for finding the attenuation coefficient of the living tissue from the depth dependency of the peak amplitude value of the aforementioned scattered waveform. In the graph shown in FIG. 11, the ordinate is plotted as the amplitude log (A) of the peak of the scattered waveform and the abscissa as the ultrasound propagation distance X. The attenuation coefficient α[dB/MHz/cm] is evaluated by the following equation.

$$\alpha = 20\{\log(A_0) - \log(A_{mn})\}/\{f \cdot X\} \quad (5)$$

where
the center frequency of the ultrasound; and $A_0$: the log value of the amplitude at the ultrasound propagation distance X=0.

Figure 13:
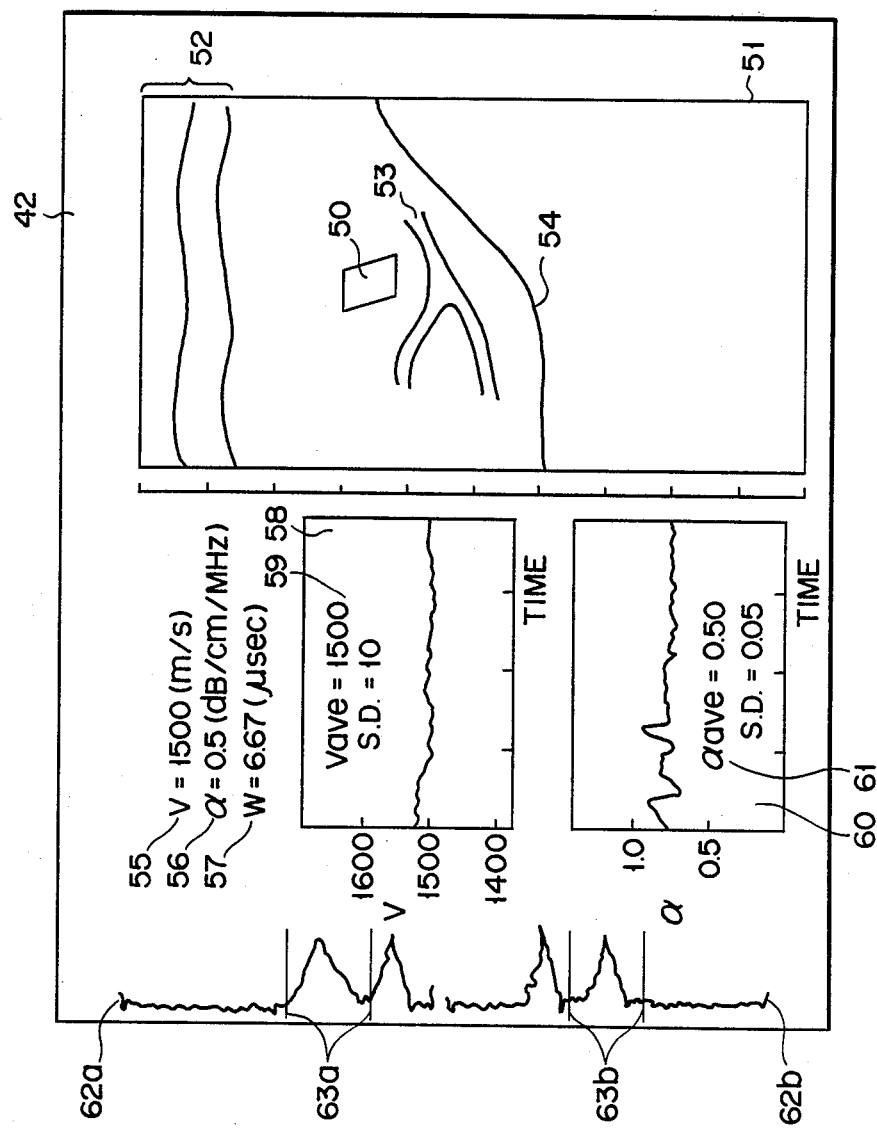

FIGS. 12 and 13 show forms of display on the system of this invention. In real time (FIG. 12), marker 50 showing the ROI is displayed on B mode image 51 in accordance with the cross beam method. In the Figure, abdominal wall 52, hepatic veins 53 and diaphragm 54, for example, are shown on B mode image 51 in the neighborhood of the liver.

Shown in the other area on display 42 are average ultrasound propagation velocity 55, attenuation coefficient 56 and scattered waveform width 57 of the ROI as obtained through the measurement with the cross beam method, time variation diagram 58 related to the ultrasound propagation velocity, time variation diagram 60 of the attenuation coefficient, A mode images 62a and 62b for the respective route and gates 63a, 63b for obtaining the scattered waveform for the ROI of the living tissue. In "freeze" time of FIG. 13, the time average value of the ultrasound propagation velocity, standard deviation 59, the time average value of the attenuation coefficient and standard deviation 61 are shown.

Here the average ultrasound propagation velocity Ca is evaluated as follows:

$$Ca = \sqrt{\frac{d}{\tau_0} \cdot \frac{(m \cdot n)\Sigma\Sigma y_{mn}^2 - (\Sigma\Sigma y_{mn})^2}{(m \cdot n)\Sigma\Sigma t_{mn}y_{mn} - \Sigma\Sigma t_{mn}\Sigma\Sigma y_{mn}}} \quad (6)$$

Figure 14:
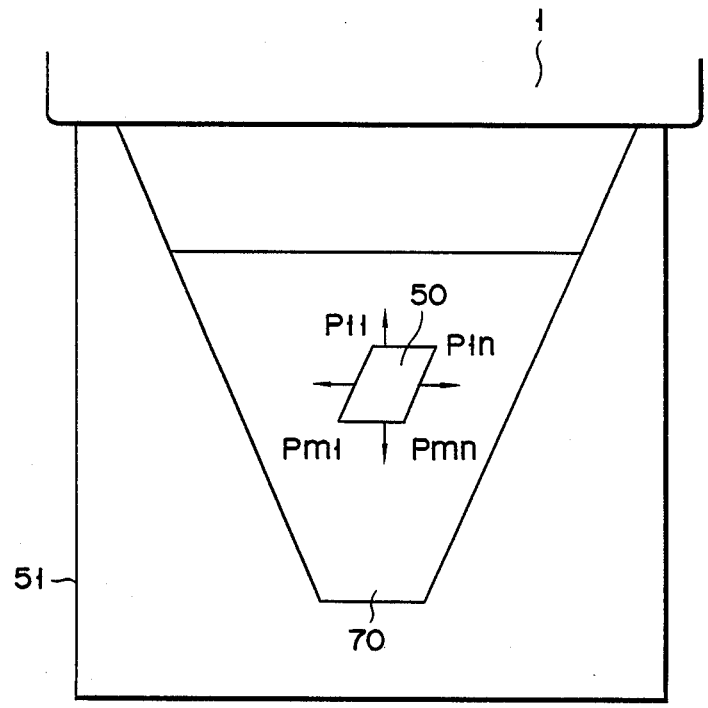
FIG. 14 is a view showing a measurable area in a probe on the system of this invention.

FIG. 14 shows a measurable area 70 of ultrasound propagation velocity, scattered waveform width and attenuation coefficient as obtained by switching the position of the oscillating element for generating the ultrasonic wave. In FIG. 14, the area enclosed by $P_{ll}$, $P_{ln}$, $P_{ml}$ and $P_{mn}$ shows ROI 50 for measurement. In measurable area 70, the distribution of the ultrasound propagation velocity, scattered waveform width and attenuation coefficient can be obtained through the scanning of ROI 50. Here the ultrasound propagation velocity, scattered waveform width and attenuation coefficient are "color matched" as shown, for example, in FIGS. 15A to 15C and, in this way, can be displayed as color images on part of B mode image 51, that is, on measurable area 70.

Figure 16A:
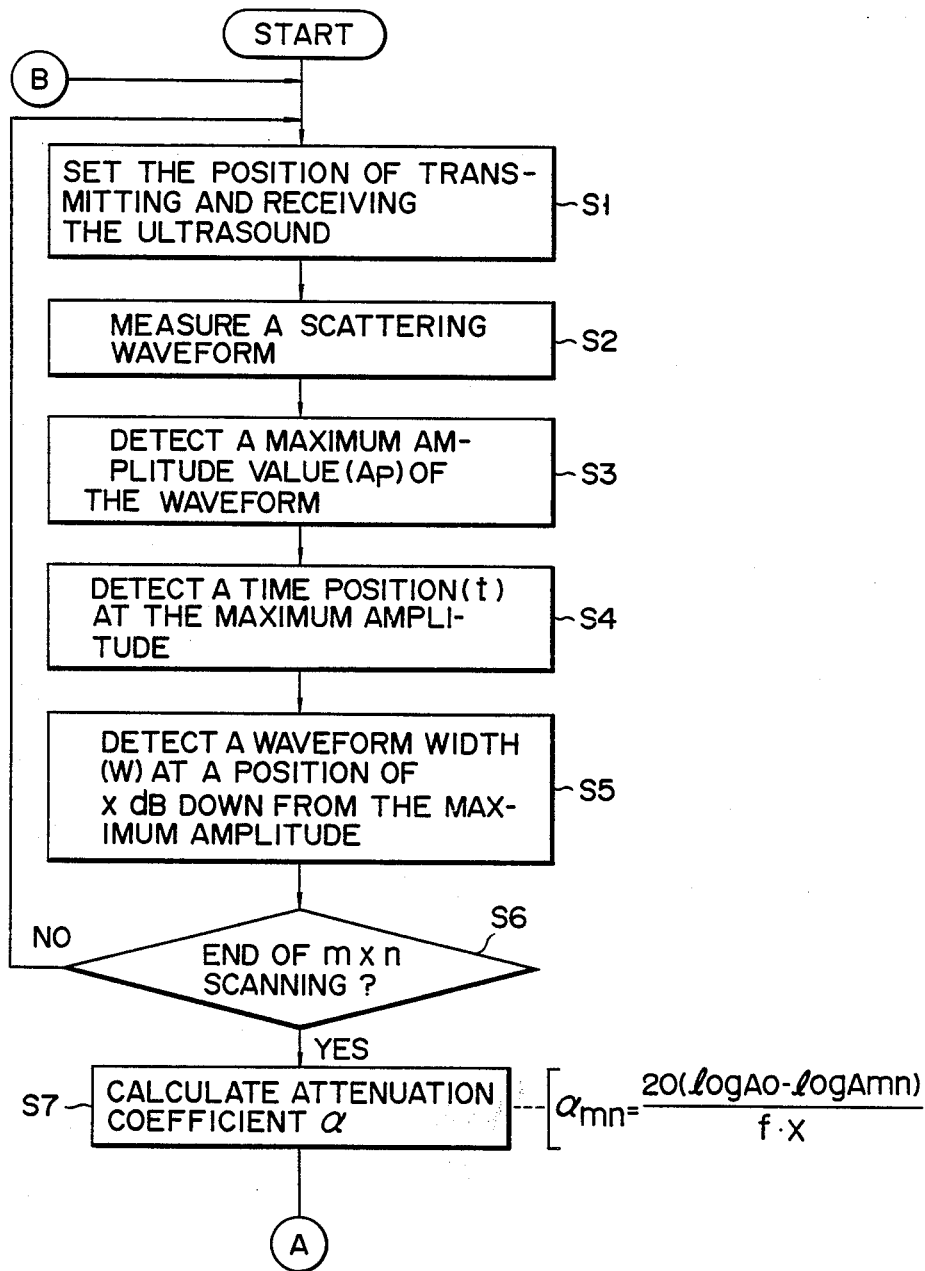
FIGS. 16A and 16B are a flowchart for performing a processing operation in accordance with a cross beam method.
Figure 16B:
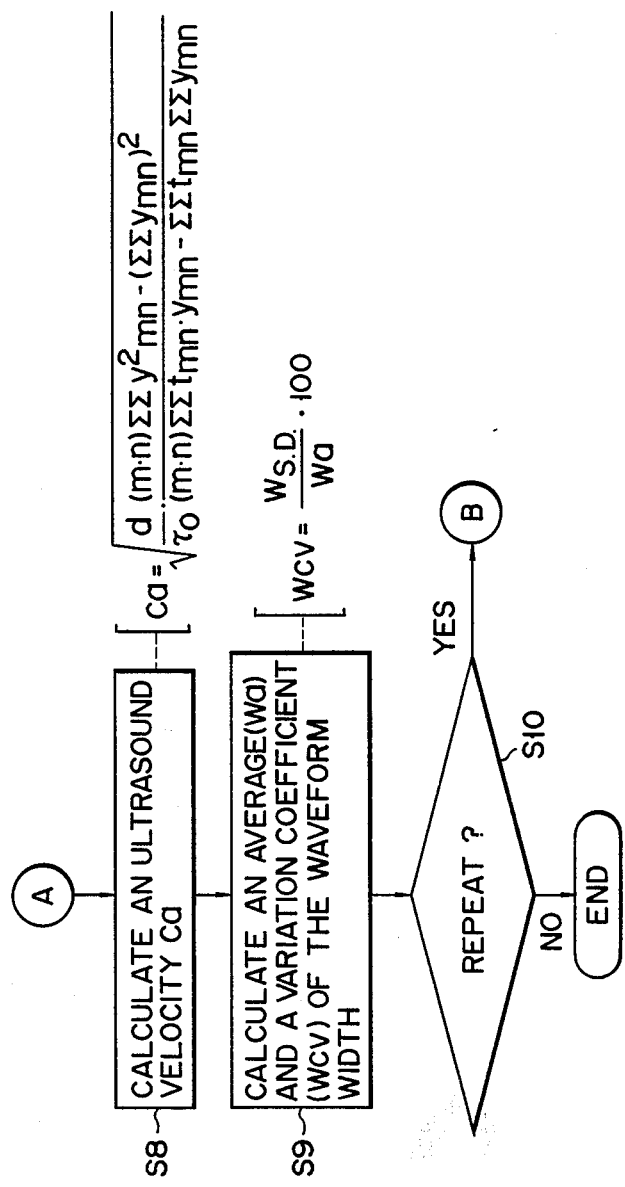

The process of measurement to be made in the cross mode under control of the computer in the system of this invention will be explained below in accordance with the flowchart as shown in FIGS. 16A and 16B.

At step S1, the transmitting/receiving position of the oscillating elements in the probe is determined so as to set the beam intersection on the ultrasound beam route for cross mode measurement, that is, to set an m×n ROI of the living tissue. The measurement of the scattered waveform (step S2) is carried out subsequent to determining the transmitting/receiving position of the oscillating elements in the probe. For the scattered waveform obtained at step S2, the peak amplitude value Ap is detected at step S3, the time position $t_2$ is detected at step S4 for the peak amplitude value Ap obtained at step S3. The ultrasound propagation time t is computed from the time position $t_2$. At step S5, a waveform width W is found at a location of x [dB] down, for example, 3 [dB] down, from the peak amplitude value Ap obtained at step S3.

At step S6, it is determined whether or not the measurement of the m×n ROI which is preset at step S1 has ended. If not, the process from step S1 to S5 is repeated. If the measurement of the m×n ROI of the living tissue is ended, then step S7 and subsequent steps are performed.

At step S7, the attenuation coefficient α is computed using equation (5). In fact, the attenuation coefficient is obtained by finding the gradient of the peak amplitude value in the depth direction as shown in FIG. 11. At step S8, the average ultrasound propagation velocity Ca is computed with the use of equation (6) and at step S9 the average width Wa and variation coefficient $W_{CV}$ of the scattered waveform are computed. The variation coefficient $W_{CV}$ is evaluated by the following equation:

$$W_{CV} = W_{S.D.}/Wa \times 100.$$

Here $W_{S.D.}$ denotes a standard deviation of the scattered waveform.

At step S10, it is determined whether or not the aforementioned operation should be repeated. Where the other ROI is to be measured, the process returns to step S1. If not, the measuring operation with the cross mode method is terminated, noting that this operation is carried out between the successive B mode images.

At the "freeze" time, since not only the time average value and standard deviation of the ultrasound propagation velocity, scattered waveform width and attenuation coefficient, but also the color image distribution, are obtained, these are stored or reserved as comprehensive measurement data to be used subsequently. Where a shift is made from the "freeze" time to the real time, the measuring data, such as the B mode image, ultrasound propagation velocity, scattered waveform width and attenuation coefficient, are sequentially updated.

In the embodiment of this invention, not only the ultrasound propagation velocity but also the scattered waveform width and attenuation coefficient can be simultaneously measured and displayed on the B mode image in real time.

Figure 17A:
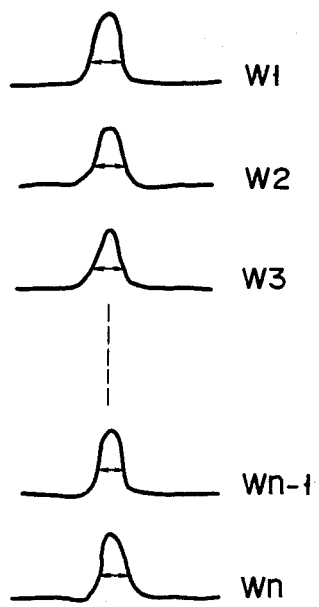
FIGS. 17A and 17B are views showing a scattered ultrasound waveform as obtained on the system of this invention.
Figure 17B:
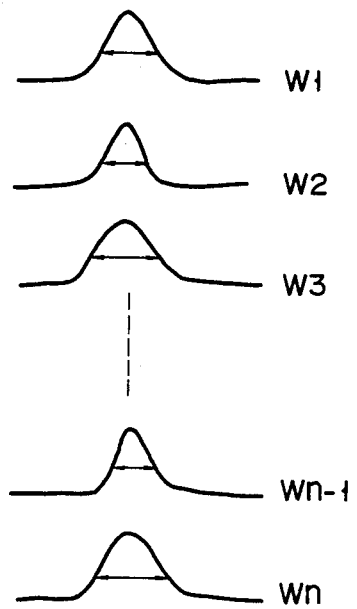
Figure 18A:
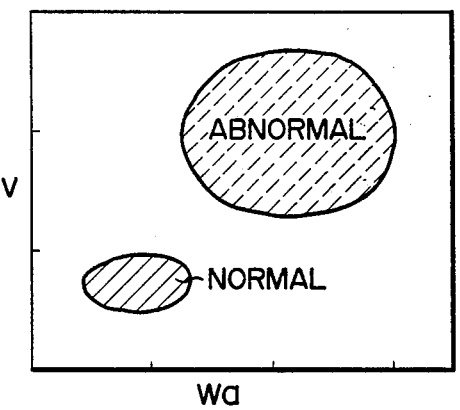
FIGS. 18A to 18C are views for determining a diseased region by the tissue characterization value as obtained in accordance with the system of this invention.
Figure 18B:
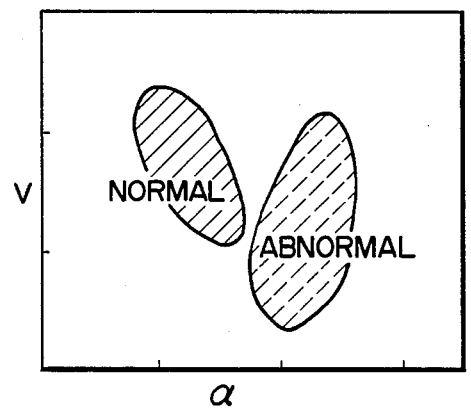
Figure 18C:
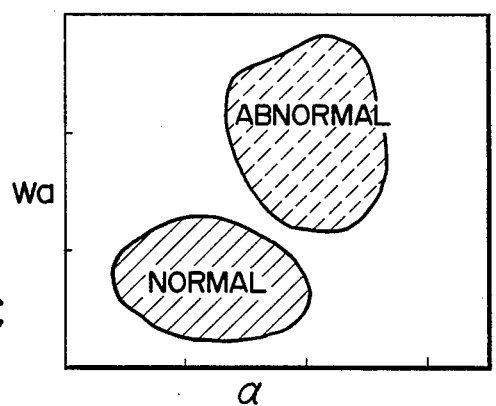

FIGS. 17A and 17B illustrate an example of comparison between the scattered waveform width of an abnormal, that is, diseased, ROI and that of a normal ROI in the living tissue. In the normal case the width of the ROI is narrower than in the abnormal ROI, and in the abnormal ROI the scattered waveform is affected due to the living tissue invaded by the disease. FIGS. 18A to 18C show forms of display where the diseased area is distinguished from the normal area. In FIG. 18 the diseased area is readily distinguished from the normal area in connection with the scattered waveform width, ultrasound propagation velocity and attenuation coefficient.

This invention is not restricted to the aforementioned embodiment and various modifications and changes are made without departing from the spirit and scope of this invention.

What is claimed is:

1. A method for acquiring ultrasound tissue characterization values for a region of interest of a subject, the ultrasound tissue characterization values including an ultrasound beam propagation velocity, an attenuation coefficient, and a waveform width, the method comprising the steps of:
sequentially transmitting a plurality of ultrasound beams from a corresponding plurality of ultrasound transmitting elements to the region of interest along a first axis;
sequentially receiving the ultrasound beams reflected from the region of interest along a second axis intersecting the first axis at the region of interest with a corresponding plurality of ultrasound receiving elements to obtain a waveform;
measuring a propagation time from the transmission of the transmitted ultrasound beams to the reception of the reflected ultrasound beams from the waveform and calculating the propagation velocity for the transmitted and reflected ultrasound beams using the propagation time;
measuring a peak amplitude value, a time of occurrence of the peak amplitude value, and the waveform width for the waveform;
computing the attenuation coefficient for the region of interest; and
converting the waveform into a displayed image of the region of interest and simultaneously displaying the image and the tissue characterization values.

2. The method according to claim 1, wherein the waveform width is determined at a location several decibels below said peak amplitude value.

3. The method according to claim 1, further including calculating an average ultrasound propagation velocity Ca using the equation $$Ca = \sqrt{\frac{d}{\tau_0} \cdot \frac{(m \cdot n)\Sigma\Sigma y_{mn}^2 - (\Sigma\Sigma_{mn})^2}{(m \cdot n)\Sigma\Sigma t_{mn}Y_{mn} - \Sigma\Sigma t_{mn}\Sigma\Sigma y_{mn}}}$$

where d is a distance between adjacent ones of the ultrasound transmitting and receiving elements; $\tau 0$ is a delay time; $t_{mn}$ is the propagation time at a measuring point mn in the region of interest; and $y_{mn}$ is a distance from one of the ultrasound transmitting elements to a corresponding one of the receiving elements.

4. The method according to claim 1, wherein the attenuation coefficient α[dB/MHz/cm] is obtained by use of the following equation $$\alpha = 20\{\log(A_0) - \log(A_{mn})\}/\{f \cdot X\}$$

where X is a propagation distance; $A_0$ is a log value of said peak amplitude value at X=0; $A_{mn}$ is a log value of said peak amplitude value corresponding to a specific value of the propagation distance X; and f is a center frequency of the ultrasound beams.

5. The method according to claim 1, further including scanning the region of interest to obtain a distribution of values for the propagation velocity, the waveform width, and the attenuation coefficient, color-coding the values in the distribution, and displaying the color-coded values as a color image.

6. The method according to claim 1, wherein a plurality of values for each of said tissue characterization values are obtained and displayed as a function of time for the region of interest.

7. The method according to claim 1, further including indicating the region of interest for which said tissue characterization values were found using a marker on the image.

8. The method according to claim 1, further including calculating an average value for each of said tissue characterization values for the region of interest.

9. The method according to claim 1, wherein the displaying step includes simultaneously displaying the attenuation coefficient and the ultrasound beam propagation velocity.

10. The method according to claim 1, wherein the displaying step includes simultaneously displaying the attentuation coefficient and the waveform width.

11. A system for acquiring ultrasound tissue characterization values for a region of interest of a subject, the ultrasound tissue characterization values including an ultrasound beam propagation velocity, an attenuation coefficient, and a waveform width, the system comprising:
means including a plurality of ultrasound transmitting elements for sequentially transmitting a corresponding plurality of ultrasound beams to the region of interest along a first axis;
means including a corresponding plurality of ultrasound receiving elements for sequentially receiving the ultrasound beams reflected from the region of interest along a second axis intersecting the first axis at the region of interest to obtain a waveform;
means for measuring a propagation time from the transmission of the transmitted ultrasound beams to the reception of the reflected ultrasound beams from the waveform and means for calculating the propagation velocity for the transmitted and reflected ultrasound beams using the propagation time;
means for measuring a peak amplitude value, a time of occurrence of said peak amplitude value, and the waveform width for the waveform;
means for computing the attenuation coefficient for the region of interest;
means for converting the waveform into a displayed image of the region of interest and simultaneously displaying the image and the tissue characterization values.

12. The system according to claim 11, wherein the means for measuring the waveform width determines the waveform width at a location on the waveform several decibels below said peak amplitude value.

13. The system according to claim 11, further including means for calculating an average ultrasound propagation velocity Ca according to the equation $$Ca = \sqrt{\frac{d}{\tau_0} \cdot \frac{(m \cdot n)\Sigma\Sigma y_{mn}^2 - (\Sigma\Sigma_{mn})^2}{(m \cdot n)\Sigma\Sigma t_{mn}Y_{mn} - \Sigma\Sigma t_{mn}\Sigma\Sigma y_{mn}}}$$

where d is a distance between adjacent ones of the ultrasound transmitting and receiving elements; $\tau_0$ is a delay time; $t_{mn}$ is the propagation time at a measuring point mn in the region of interest; and $y_{mn}$ is a distance from one of the ultrasound transmitting elements to a corresponding one of the receiving elements.

14. The system according to claim 11, further including means for calculating an attenuation coefficient α[dB/MHz/cm] according to the equation $$\alpha = 20\{\log(A_0) - \log(A_{mn})\}/\{f \cdot X\}$$

where X is a propagation distance; $A_0$ is a log value of said peak amplitude value at X=0; $A_{mn}$ is a log value of said peak amplitude value corresponding to a specific value of the propagation distance X; and f is a center frequency of the ultrasound beams.

15. The system according to claim 11, further including means for obtaining a distribution of values for the propagation velocity, the waveform width, and the attenuation coefficient, means for color-coding the values of the distribution, and means to display the color-coded distribution.

16. The system according to claim 11, wherein said display means includes means for displaying a plurality of values for each of the tissue characterization values as a function of time for the region of interest.

17. The system according to claim 11, wherein the display means includes means for marking the image to indicate the region of interest for which said tissue characterization values were measured.

18. The system according to claim 11, further including means for calculating an average value for at least one of said tissue characterization values.

19. The system according to claim 18, wherein the averaging means includes means for calculating an average of a plurality of values for the propagation velocity and an average of a plurality of values for the attenuation coefficient.

20. The system according to claim 11, wherein the waveform width detecting means includes means for detecting the waveform width at a predetermined level below a peak amplitude level.

21. The system according to claim 11, wherein the displaying means includes means for displaying the ultrasound beam propagation velocity and the attenuation coefficient as a function of time for the region of interest.

* * * * *